May 21, 1957  H. I. CHAMBERS  2,792,586
PRESSURE DISTRIBUTING MEANS FOR WIPER BLADES
Filed April 21, 1954
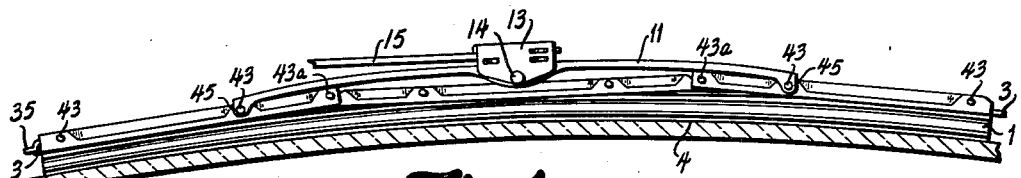
Fig. 1
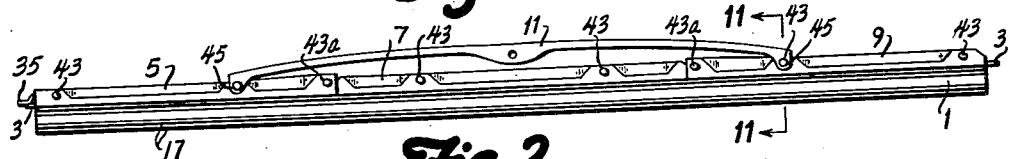
Fig. 2
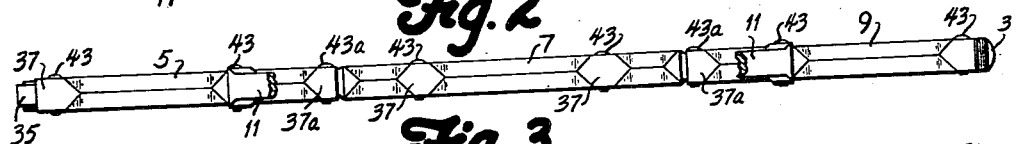
Fig. 3
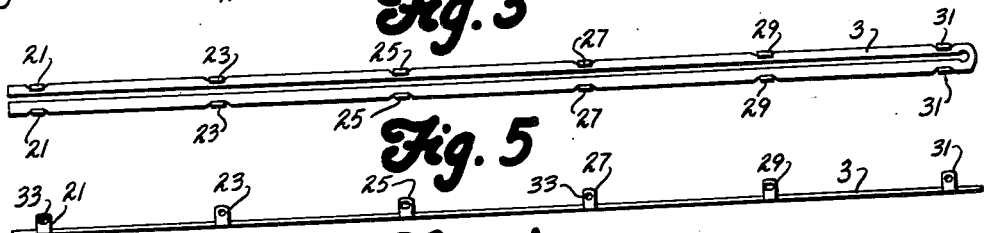
Fig. 5
Fig. 4
Fig. 6
Fig. 7
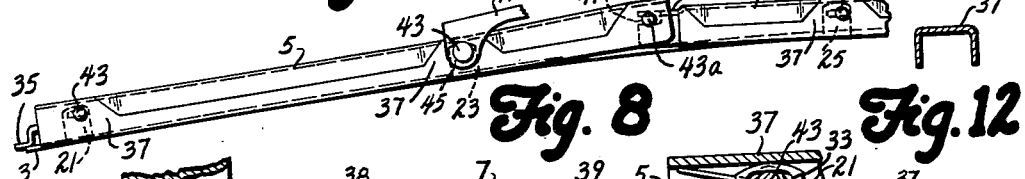
Fig. 8
Fig. 12
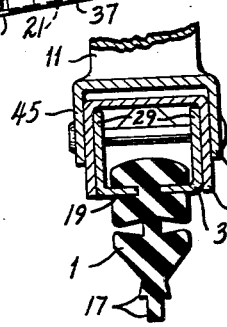
Fig. 11
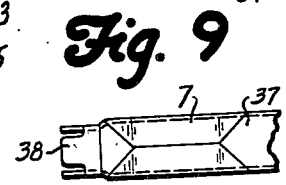
Fig. 9
Fig. 14
Fig. 13
Fig. 10
INVENTOR.
Herbert I. Chambers
BY
Falvey, Souther & Stollenberg United States Patent Office 2,792,586
Patented May 21, 1957

2,792,586
PRESSURE DISTRIBUTING MEANS FOR WIPER BLADES

Herbert I. Chambers, Toledo, Ohio

Application April 21, 1954, Serial No. 424,653

13 Claims. (Cl. 15—245)

This invention relates generally to windshield wipers and more particularly is directed to an improved wiper for curved glass windshields.

Wiper blades, adapted to wipe or clean curved glass windshields of the types which are standard equipment on present day motor cars, are subjected to constant changes in flexure as they are oscillated transversely across the glass. At one extreme of the wiping stroke, the wiper blade may be required to conform to a substantially flat surface, or one describing the arc of a circle, while at the other end, the line of contact between the wiper element and the glass may have to be elliptical in shape. The changing contour between these extremes requires a wiper blade having sufficient flexibility to allow faithful conformance to the varying surface of the glass, yet having a rigidity and strength sufficient to perform an efficient wiping job and also having sufficient durability to withstand hard usage in its exposed position subject to the elements.

It is, therefore, a principal object of this invention to provide an improved curved glass windshield wiper having an integrated construction designed to provide a close conformance of the wiper element to the contours of the glass surface throughout the full sweep of the cleaning stroke.

A further object of the invention is to provide a windshield wiper having an articulated backing construction and an integrated flexible member adapted to interact with the backing construction to maintain contact with the contours of the glass surface throughout the full sweep of the cleaning stroke.

A further object of the invention is to provide a windshield wiper having a flexible backing member uniquely performing multiple functions as part of a force distributing linkage and also acting as a supporting member for the wiper element.

A further object of the invention is to provide an economical, sufficient and sturdy curved glass windshield wiper adapted to be manufactured by high-speed production line methods.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of a wiper blade incorporating the invention as it applied to curved surfaces;

Fig. 2 is a side elevation of the device shown in Fig. 1 in an unflexed position;

Fig. 3 is a plan view, partly cut away, of the device shown in Fig. 2;

Fig. 4 is a side elevation of a flexible blade part;

Fig. 5 is a plan view of the flexible member shown in Fig. 4;

Fig. 6 is a side elevational view of a detail showing the left end portion of the backing member;

Fig. 7 is an enlarged fractional side elevation of the right end of the right portion of the backing member;

Fig. 8 is an enlarged fractional elevation of the left half of the device shown in Figs. 1 and 2 illustrating a deflected position with the wiper element removed;

Fig. 9 is a fractional side elevation of the left end of the center portion of the backing member;

Fig. 10 is a fractional plan view of Fig. 9;

Fig. 11 is a sectional view taken along line 11—11 in Fig. 2;

Fig. 12 is a sectional view taken along line 12—12 of Fig. 6; and

Fig. 13 is a sectional view taken along line 13—13 of Fig. 6.

The preferred form of the invention here disclosed comprises a longitudinal wiper element 1, preferably of rubber, secured to a thin, metallic, flexible member 3, extending the full length of the wiper element 1, being flexible in a direction substantially normal to a curved surface 4, such as a windshield, being contacted. The flexible member 3, being semi-rigid and having the quality of resilience, is attached at predetermined equidistant spaced points to a plurality of substantially channel-shaped backing members 5, 7 and 9 arranged in an articu-shaped backing members 5, 7 and 9 arranged in an articulated end-to-end relation. The backing members 5 and 9 are each pivotally attached to an end of a bridge member or yoke 11 which is centrally provided with a fastening device or clasp 13 pivotally mounted on rivet 14 for securing the entire assembly to an oscillating arm 15. The clasp 13 is described and claimed in copending application, Serial No. 231,291, now Patent No. 2,751,620.

The rubber wiper element or squeegee 1 can be any one of several available designs having wiping surfaces 17 provided along one margin, and opposed, full length mounting slots 19 along the opposite margin. The flexible member 3, shown in Figs. 4 and 5, has the general configuration of an elongated U and is provided with a plurality of equispaced, upturned integral tabs or ears 21, 23, 25, 27, 29, 31, along both outer edges of the U which are mounted in pairs along the flexible member 3, each tab having an opposed tab positioned directly across from it and bearing the same reference numeral in the figures (Fig. 5). Holes 33 are provided in each tab in such a manner that the holes 33 in opposed tabs are aligned across the flexible member 3. In the case of the tabs 21, 25, and 29, the tab holes 33 are elongated in a direction parallel to the plane of the main body for reasons to be explained below. It will be noted that the alongated apertures appear in alternate tabs.

The wiper element 1 is assembled with the flexible member 3 by sliding the inner edges of the open end of the U into the corresponding opposed slots 19 of the wiper element 1 (Fig. 11). By forcing the wiper element 1 longitudinally into the U to a position entirely within the U, the wiper element 1 is mounted within the bight of the flexible member 3 and is supported thereby throughout its entire length. A retaining latch 35, detailed in Fig. 14 and to be explained later, is provided to prevent the wiper element 1 from being displaced from the bight of the U of the flexible member 3. The assembly of the wiper element 1 and the flexible member 3 resists bending in a plane substantially normal to the wiping margin of the wiping element 1, but does not appreciably resist flexing in the plane of the wiping margin. In other words, the assembly is stiff in the direction parallel to the plane of the glass 4, but is relatively flexible normal thereto.

Figs. 1, 2, and 3 illustrate the relations of three backing members 5, 7, and 9 which are substantially channel-shaped, as shown in Fig. 13, and are provided with squared-up enlarged portions forming housings 37, as shown in Fig. 12, positioned intermediate their ends at spaced intervals equal to the interval between adjacent pairs of tabs on the flexible member 3, excepting those positioned at the outer ends. The housings 37 are designed to receive the corresponding pairs of tabs on the flexible member 3 when the latter, together with the rubber wiper element 1, is assembled in operative relation to the backing members 5, 7, and 9 arranged in end-to-end relation. Joint housings 37a are provided at the inner ends of the two outer backing members 5 and 9 which are slightly enlarged in a vertical direction to receive the attenuated ends 38 of the center member 7, as seen in Figs. 8, 9, and 10.

Holes 39 are provided in each of the opposing walls of each of the housings 37 of the backing members to receive transverse tubular rivets 43 which also cooperate with apertures 33 in the spaced tabs or ears on the flexible member. Rivets 43a also are provided in joint housings 37a to cooperate with each end of the center backing member 7. These ends are provided with slots 41 formed by cutting away portions in the sides of the channel to cooperate with the rivets 43a and to furnish a sliding pivotal contact between the ends of center backing member 7 and the inner ends 37a of the outer backing members 5 and 9, as will be explained later.

The rivets 43 are used to hold the elements of the wiper assembly together in operative form, but it should be recognized that any satisfactory method of securing a pivotal joint can be utilized. The center backing member 7 is centrally located on the flexible member 3 and is assembled thereto by tubular rivets 43 passing through the aligned holes 33 in the tabs 25 and 27 and the side walls of the housings 37. Similar rivets 43 are utilized to assemble the outer backing members 5 and 9 to the flexible member 3, the inner end 37a of members 5 and 9 receiving the attenuated ends 38 of the center backing member 7 with the slots 41 embracing rivet 43a. The rivet 43 at the left end of the left backing member 5 (Figs. 1 and 14), in addition to passing through the aligned holes in the end joint housing and the tabs 21, carries a retaining device 35 in the form of a spring steel clip adapted to obstruct the open end of the elongated U of the flexible member 3 to prevent the escape of the rubber wiper element 1 from the flexible member 3. The clip allows replacement of a used or damaged rubber wiper element 1 by manual manipulation in a relatively easy manner without the use of any tools.

The center rivets in the end portions of backing members 5 and 9, besides passing through tabs 23 and 29 and the center housing of the members, also pass through holes provided in depending integral ears 45 of the bridge or yoke member 11 which straddle the housings, thereby securing the ends of the bridge 11 to the backing members 5 and 9 in a pivotal relationship (Figs. 2 and 3).

The fastening device 13 is centrally carried by the bridge 11 and receives the end of the actuating arm 15 which is connected to any suitable actuating means such as the usual oscillating shaft (not shown).

Successful operation of this windshield wiper for curved glass depends upon the application of a force to the blade which is normal to the curved surface and which is sufficiently strong to maintain wiping contact between the surface for the full length of the wiper element 1. This force is applied to the attaching device 13 by the oscillating actuating arm 15 and is distributed to the rubber wiper element 1 by the action of the force distributing linkage comprising the yoke 11, the backing members 5, 7, 9, the flexible member 3 with tabs 21 through 31, and the means by which these parts are held together. From the attaching device 13, the applied force is divided by the yoke 11 and transmitted to the end backing members 5 and 9 by the rivets at tabs 23 and 29. Where the surface to be wiped is uniformly curved, the reaction force by the surface is originally more or less concentrated at the center of the wiping element 1 but is distributed by any transitional movement of the blade. This original reaction force is transferred by the rubber wiper element 1 to the flexible member 3, and its tabs 25 and 27, to the corresponding rivets and then to the center backing member 7. The effects of the combination of the applied force by the outer ends of the yoke 11 (at tabs 23 and 29) and the reaction force from the curved surface at the center of the wiping element will be described with reference to an imaginary datum plane selected to pass through the rivets through tabs 23 and 29.

The center backing member 7 is stationary at the peak of the curved surface while the datum plane is moved in the direction of the curved surface by the applied force to bring element 1 into full contact with the curved surface. The end backing members 5 and 9 are thereby both deflected from the datum plane toward the curved surface by pivoting about rivets at the ends of the yoke 11 and shifting around their pivotal connections at the ends of the center backing member 7. (It should be noted that the rivets 43a slide in the slots 41 to allow the backing members to adjust to the longer curved distance.) This deflection continues until the ends of the wiper element 1 contact the curved surface, the shifting in the relative lever arm distances between the rivet stations of the end backing members 5 and 9 making such extreme deflection possible. When the end backing members are in the fully deflected position the reaction force from the curved surface, formerly substantially concentrated at the center of the wiping element, is distributed over the entire length of the wiper element with small peaks of force concentration opposite both ends of the yoke 11. In addition, the fully deflected backing members 5 and 9 establish three points in each half of the blade which substantially define the locus of curvature to be smoothed out and integrated by the flexible member 3 and the wiper element 1. In the left half, the three locus of curvature points are at tabs 21, 23, and 25; in the right half at tabs 27, 29, and 31. Referring now to the left half of the blade, as shown in Fig. 8, the flexible member portion 3 shown has been forced to conform to the three established points at tabs 21, 23 and 25 by the backing members 5 and 7. Those portions of the flexible member between these established points are forced into an arcuate shape having the same degree of curvature as that defined by the three established points on each side of the blade in the following manner. The portion of the flexible member between tabs 23 and 25 is deflected from the datum plane simultaneously with the end backing member 5, as previously described, by virtue of the connections between the two at tabs 23 and 25. The resilient characteristic of the flexible member 3 causes that portion of the flexible member between tabs 23 and 25 to form a smooth curve conforming to the surface curvature and causes the adjacent portions of the flexible member (those portions between tabs 21 and 23 and 25 and 27) to tend to extend tangentially in each direction from the curve between the tabs 23 and 25. However, the ends of each of the portions of the flexible member 3 are anchored to those points in the backing members which define the curvature of the surface, thereby causing the adjacent portions to bend arcuately, just as did the portion between tabs 23 and 25. Of course, the reaction pressures from the surface which act on the portions of the flexible member between the tabs also serve to cause the proper degree of curvature at those portions. The slots in the alternate tabs will allow the flexible member to shift laterally to accomplish an accurate approximation of the curvature of the surface.

It should now be clear that the curvature of the surface determines the displacement of the center backing member 7 from the datum plane; the displacement of the center backing member determines the deflection of the end backing members 5 and 9 to establish the six points of the curve of the surface; the deflection of the end backing members 5 and 9 determines the magnitude of the resilient forces opposing deflection of the flexible member 3, thereby governing the amount of curvature between the tabs of the flexible member 3. This chain of dependent motion results in an accurate approximation of the surface curvature in the blade.

In the final position against the surface, the applied forces at the end of the yoke 11 are distributed to the six pairs of tabs of the flexible member as follows. Tabs 23 and 29 receive the applied force directly from the rivets at the ends of the yoke. Tabs 21 and 31 are urged towards the curved surface by the lever action of the end backing members 5 and 9 acting about rivets in tabs 23 and 29 as previously described. Tabs 25 and 27 receive components of the applied forces acting through rivets 43a at the slotted joint connections between the center and end backing members which will transmit only those forces substantially normal to the surface. The six pairs of tabs 21 through 31 distribute their individual allocations of the applied force to the portions of the flexible member adjacent the tabs, thereby effectively distributing the applied force over the entire length of the wiper element. In the final position, the reaction force is more or less uniformly distributed over the length of the wiper with the exception of the small concentrations directly opposite the ends of the yoke 11.

Convex surfaces other than uniformly curved arcs are easily cleaned by this device. Where one half of the wiper encounters a surface having a different curvature than that encountered by the other half, the original reaction force of the surface is substantially concentrated at a point removed from the center of the blade. This unbalance causes one end of the center backing member 7 to be displaced a greater distance from the datum plane than the opposite end, thereby positioning the three points in each half of the blade to establish dissimilar curvatures and unequal forces to urge the wiper element 1 into full length contact with the surface.

When the blade is used on a flat surface, the six points all lie in the datum plane. There is no displacement or deflection of the backing members, but the applied force is transmitted from the ends of the yoke 11 to the wiper element 1 in the same manner as has been described for a curved surface.

Attention is especially directed to the multiple functions of the flexible member 3 in the operation of the blade. It acts as a member of the force distributing linkage by transferring both applied and reaction forces to associated members of the linkage. It also assists in achieving a curvature of the wiper element which accurately approximates the curvature of the surface contacted. Finally, it supports the wiper element 1 in a manner which assures positive contact between the surface and the wiper element throughout its full length.

It is to be understood that the above detailed description of the present invention is intended to disclose an embodiment thereof to those skilled in the art, but that the invention is to to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a wiper element, an articulated backing member, a resilient member supporting the wiper element throughout its length and at least three spaced means cooperating with the members to provide a pivotal attachment for the articulated backing member arranged to interact with the resilient member to conform the wiper element to the curvature of a surface to be cleaned.

2. In a device of the class described, a flexible wiper element, a resilient member deflectable in one plane supporting the flexible element for its full length and having integral connecting means equispaced along its length, an articulated backing means having at least three cooperating elements adapted for pivotal connection to the resilient member at each of the connecting means, a pressure-applying yoke having its ends pivotally attached to both the resilient member and the articulated backing means at connecting means intermediate the ends of the resilient member, the said articulated backing means having its articulated joints between its elements located within the span of the yoke intermediate the spaced connecting means and independent of the resilient member so that the backing means and the resilient member may be deflected in one plane by the pressure applied by the yoke to conform the wiper element to a curved surface.

3. In a device of the class described, a conformable wiper element, a resilient member supporting the wiper element throughout its length and having perforated tabs projecting normally therefrom, backing members arranged in end to end relation cooperating by articulated joints and provided with means for attachment to the resilient member at said tabs for interaction therewith to conform the wiper element to the surface to be cleaned, a yoke member spanning the articulation joints and being pivotally attached to opposite end backing members intermediate their ends, and means to apply pressure to the yoke.

4. A wiper blade assembly for curved surfaces comprising, a conformable wiper element, a flexible member supporting the wiper element for its full length, three backing members pivotally attached at equispaced points to the flexible member and arranged in end to end relation for deflecting opposite end backing members toward a curved surface about shiftable pivotal joints provided at opposite ends of a center backing member, a yoke member spanning the center backing member and the shiftable pivotal joints and having its ends pivotally connected to the opposite end backing members intermediate their ends, and a pressure-applying means attached to the yoke member.

5. In a device of the class described, a longitudinally-disposed force distributing system for a wiper element for curved glass comprising a resilient member, a force-applying yoke member, and three articulated backing members in end to end relation, means to attach the yoke member to intermediate points of the end backing members, equispaced transverse pivotal means connecting the resilient member to the three backing members, and other longitudinally shiftable transverse means between the equispaced means adapted to form pivot points for articulation of the backing members, said system conforming the wiper element for its full length to a curved surface in a cleaning attitude when urged in a direction substantially normal to the surface by a force applied by the yoke member.

6. In a device of the class described, a longitudinally-disposed force distributing means for allocating and distributing a force applied substantially normal to and toward a curved surface whereby a cleaning element of flexible material is conformed to the curved surface for its entire length comprising, a cleaning element, a continuous resilient member supporting the cleaning element, three articulated backing members and a force-applying yoke member, all members being assembled in operative interacting fashion on the resilient member by at least three transverse means forming pivotal joints substantially parallel to the curved surface equispaced along the length of the resilient member.

7. In a device of the class described, a conformable wiper element, a resilient member supporting the wiper element for its full length, three longitudinally disposed backing members cooperating by pivotal connections at abutting ends and having each backing member pivotally connected in at least two places to the resilient member, the combination allowing deflection of the end backing members and the resilient member toward a curved surface, a yoke member spanning the abutting end connections and having its ends pivotally connected to the opposite end backing members intermediate their ends, and means to apply pressure to the yoke.

8. In a device of the class described, an elongated wiper element adapted to conform to a surface of changing curvature, a flexible member resilient in a plane substantially normal to the surface supporting the wiper element throughout its length, three backing members pivotally connected to spaced connecting means on the flexible member and disposed longitudinally in articulated end to end relation by cooperative pivotal means for interaction with the flexible member to conform the wiper element to the surface, and a pressure-applying yoke spanning the pivotal means having its ends pivotally attached to the end backing members for deflecting the end backing members according to the curvature of the surface.

9. In a device of the class described, a cleaning element of flexible material, a resilient member supporting the cleaning element and having spaced integral connecting means projecting therefrom, longitudinally disposed backing members pivotally connected to the resilient member at the spaced connecting means and provided with articulated joints at their cooperating ends intermediate the connecting means independent of the resilient member for deflecting the end backing members toward a curved surface being cleaned and for adjusting the relative longitudinal position of the backing members, a pressure-applying yoke member pivotally attached to the end backing members at points outside the articulated joints, and means for applying pressure to the yoke.

10. In a device of the class described, a conformable wiper element, a metallic resilient member supporting the wiper element for its full length and having integral spaced pairs of perforated tabs projecting normally therefrom, three articulated backing members arranged in end to end relation and cooperating with each pair of tabs by transverse journals to pivotally assemble the resilient member to the backing members, means at opposite ends of the center backing member intermediate the spaced tabs cooperating with the inner ends of the end backing members to provide relative longitudinal and pivotal movement of the end backing members with relation to the center backing member, a pressure-applying yoke member having its opposite ends pivotally attached to the end backing members intermediate their ends, and means for applying pressure to the yoke member.

11. In a device of the class described, an elongated flexible wiping element, a U shaped metallic resilient member supporting the wiper element for its full length within the bight thereof and having integral spaced pairs of perforated tabs projecting normally therefrom, three articulated channel-shaped backing members arranged in end to end relation having spaced housings provided with perforated side walls cooperating with the perforated tabs, transverse journal means for pivotally assembling the resilient member to the backing members at each spaced tab, the center backing member having its opposite ends attenuated and provided with transverse slots, said attenuated ends being freely received within enlarged integral joint housings provided at each of the inner juxtaposed ends of the end backing members, transverse axial means mounted in said joint housings and passing through said slots to provide pivotal and longitudinal movement of said end backing members relative to the center backing member, said cooperative relation of the backing members being positioned between the spaced tabs on the resilient member, an arcuately-shaped pressure-applying yoke spanning the center backing member and joint housings provided with perforated depending ears at its ends adapted to cooperate with the end backing members intermediate the ends thereof by a pivotal connection, and means to apply pressure to the yoke.

12. In a device of the class described, a longitudinally disposed center backing member, two end backing members, two end backing members deflectable in a single plane toward a curved surface about shiftable axial means at opposite ends of the center member, a resilient member provided with integral spaced assembling tabs along its length adapted to support transverse axial means for pivotally connecting the resilient member and the backing members, any three of the transverse axial means substantially defining the curvature of the surface traversed by the said transverse axial means, a wiper element secured to the resilient member, and a yoke member pivotally secured at its ends to the end backing members intermediate their ends.

13. In a device of the class described, a flexible wiping element, a resilient member bendable in one plane supporting the flexible element throughout its length, links disposed longitudinally of the resilient member and pivotally attached to the resilient member at spaced substantially equidistant points in end to end relation with articulated joints between the links being provided at their cooperating ends between points of attachment to the resilient member, and means to apply pressure to the end links and the resilient member at spaced points intermediate the ends of the resilient member whereby the pressure is distributed uniformly over the length of the resilient member by the interaction of the links and the resilient member to conform the flexible element in a smooth curve to a curved glass.

References Cited in the file of this patent
UNITED STATES PATENTS

| | | |
|---|---|---|
| 2,596,063 | Anderson | May 6, 1952 |
| 2,601,664 | Nesson | June 24, 1952 |
| 2,634,446 | Mackie et al. | Apr. 14, 1953 |